United States Patent
Mito et al.

(10) Patent No.: US 9,764,241 B2
(45) Date of Patent: Sep. 19, 2017

(54) GAME SYSTEM UTILIZING NETWORK

(75) Inventors: Yasushi Mito, Minato-ku (JP);
Hidekazu Shimizu, Minato-ku (JP);
Masanori Kono, Minato-ku (JP); Koji Makino, Minato-ku (JP); Masayuki Shamoto, Minato-ku (JP); Satoshi Tsuchida, Minato-ku (JP); Ryo Horie, Minato-ku (JP); Yuki Nakano, Minato-ku (JP); Naoko Nasuhara, Minato-ku (JP); Tomohiro Inami, Minato-ku (JP)

(73) Assignee: KONAMI DIGITAL ENTERTAINMENT CO., LTD., Minato-Ku, Tokyo (JP)

( * ) Notice: Subject to any disclaimer, the term of this patent is extended or adjusted under 35 U.S.C. 154(b) by 483 days.

(21) Appl. No.: 14/234,894

(22) PCT Filed: Aug. 1, 2012

(86) PCT No.: PCT/JP2012/069601
§ 371 (c)(1),
(2), (4) Date: Jan. 24, 2014

(87) PCT Pub. No.: WO2013/018833
PCT Pub. Date: Feb. 7, 2013

(65) Prior Publication Data
US 2014/0155176 A1  Jun. 5, 2014

(30) Foreign Application Priority Data
Aug. 4, 2011  (JP) .................................. 2011-171367

(51) Int. Cl.
*A63F 13/79*  (2014.01)
*A63F 13/795*  (2014.01)
*A63F 13/30*  (2014.01)

(52) U.S. Cl.
CPC ............ *A63F 13/795* (2014.09); *A63F 13/12* (2013.01); *A63F 13/30* (2014.09); *A63F 13/79* (2014.09);
(Continued)

(58) Field of Classification Search
CPC ........ A63F 13/12; A63F 13/79; A63F 13/795; A63F 13/798; A63F 2300/5546;
(Continued)

(56) References Cited

U.S. PATENT DOCUMENTS 6,203,433 B1 *  3/2001  Kume ..................... A63F 13/12
463/41
2002/0086732 A1 *  7/2002  Kirmse ................... A63F 13/12
463/42

(Continued)

FOREIGN PATENT DOCUMENTS

CN  1801725 A  7/2006
JP  2011-004799 A  1/2011
(Continued)

OTHER PUBLICATIONS

International Search Report—Date of Mailing Oct. 30, 2012.
(Continued)

*Primary Examiner* — Damon Pierce
(74) *Attorney, Agent, or Firm* — Howard & Howard Attorneys PLLC

(57) ABSTRACT

This game system (1) includes multiple game machines (2A, 2B) connected to a network (5), allows a player of a game machine to select one of selective items on a game prepared in advance, and allows the player to play a game having content reflecting the selected item. This game system is provided with a device (32) for storing relation data for determining whether or not a predetermined connection exists between players, a device (11) for determining the selection state pertaining to the items selected by the players on the game machines, a device (11, 12) for determining, based on the relation data, other players that have the predetermined connection with the player, and a device (21) which, when the player is making the selection from the selective items, presents the player making the selection
(Continued)

with the selection state of other players having the predetermined connection with that player.

6 Claims, 8 Drawing Sheets

(52) U.S. Cl.
CPC .............. *A63F 2300/5566* (2013.01); *A63F 2300/6054* (2013.01); *A63F 2300/8047* (2013.01)

(58) Field of Classification Search
CPC ........ A63F 2300/556; A63F 2300/5566; A63F 2300/8047
See application file for complete search history.

(56) References Cited

U.S. PATENT DOCUMENTS

| | | | |
|---|---|---|---|
| 2004/0152517 A1* | 8/2004 | Hardisty | ............... A63F 13/12 463/42 |
| 2007/0218997 A1* | 9/2007 | Cho | ..................... A63F 13/12 463/42 |
| 2007/0298879 A1 | 12/2007 | Kobayashi et al. | |
| 2008/0102958 A1* | 5/2008 | Kitamura | ............... A63F 13/12 463/42 |
| 2008/0102960 A1 | 5/2008 | Jiao et al. | |
| 2010/0009750 A1* | 1/2010 | Egozy | ................. A63F 13/005 463/35 |
| 2012/0028719 A1 | 2/2012 | Inubushi et al. | |

FOREIGN PATENT DOCUMENTS

| | | |
|---|---|---|
| WO | 2006/022080 A1 | 3/2006 |
| WO | 2010/113935 A1 | 10/2010 |

OTHER PUBLICATIONS

Notification to Grant Patent Right for Invention in English with Original Chinese Document (Chinese Patent Application No. 201280037575); dated May 15, 2017.

* cited by examiner

GAME SYSTEM UTILIZING NETWORK

CROSS REFERENCE TO RELATED APPLICATION

This application is a national stage application of PCT/JP2012/069601, filed Aug. 1, 2012, which claims priority to Japanese Patent Application No. 2011-171367, filed Aug. 4, 2011, the disclosures of which are hereby incorporated by reference in their entirety.

TECHNICAL FIELD

The present invention relates to a game system utilizing a network.

BACKGROUND ART

As a game system utilizing a network, there is known a game system where a plurality of game machines are connected with a network, and a plurality of players are allowed to play a common game using communication between the game machines. As this type of game system, there is a game system which allows each player to select his/her desired one from a plurality of selective items for a game such as a participation mode and a battle type, and allows the players whose desired items coincide with each other to participate in a same common game (for example, see the Patent Literature 1).

Patent Literature: PTL1: JP-A-2011-004799.

SUMMARY OF INVENTION

Technical Problem

Generally, with respect to such a game machine, it is attempted to increase the number of selective items in a game in order to enhance interest of the game. However, when the number of choices increases, inconvenient matters sometimes occur. For example, as it becomes hard for a player to find his/her desired item from a lot of selective items, inconvenient matter could occur such that it takes a long time for a player to select his/her desired item, or a player selects unintended item in a lather because of time limit. In addition, even if provided is a common game, like the game disclosed in the patent literature 1, which a player can participate in when the player's selected item coincides with the others' one, the player cannot decide which item he/she should select, and therefore, would fail to participate in the common game.

Then, the present invention aims to provide a game system capable of giving a felicitous guideline to a player when the player is allowed to select his/her desired item from a plurality of selective items in a game.

Solution to Problem

One aspect of the present invention is realized as a game system including a plurality of game machines connected to a network to make a player of each of the plurality of game machines: select a desired item from a plurality of selective items; and play at the game machine of the player a game having content reflecting the item selected, the game system comprising: a data storage device storing relation data having information necessary for determining whether or not a predetermined connection exists between players; a selection state determining device configured to determine selection state of the selective items pertaining to the player at each of the plurality of game machines; a relation determining device configured to determine based on the relation data another player having the predetermined connection with the player; and a selection state presenting device configured to present to the player making the selection of the item, the selection state determined by the selection state determining device pertaining to the player who is determined by the relation determining device as the another player having the predetermined connection.

The present invention focuses on the fact that the selection state of a player of each game machine can be determined in the environment that a plurality of game machines are connected to a network. By sorting out information obtained by the determination in consideration of the connection between players and presenting the selection state of the player having the connection, the present invention gives a guideline for selecting an item to each player. That is, in the game system of the present invention, based on the relation data, determined is another player having a predetermined connection with the player making the selection of selective items, determined is the selection state pertaining to the another player, and the selection state determined is presented to the player. Accordingly, the player making the selection can get to know which item is being selected by the another player having a predetermined connection with the player, and by using this as a guideline, the player is allowed to determine to select the same item or the other item on purpose.

In the present invention, it is possible to set the connection from various aspects. For example, when between players there is a human relation such as associates, friends, and acquaintances, it may be determined that such players have a predetermined connection and the connection may be set in the relation data. In addition, when there is a common or similar relation on a game such as the level, the status, the game-play hours, and the game-play times pertaining to the players, it may be determined that the players have a predetermined connection and the connection may be set in the relation data. The setting of the connection to the relation data can be realized by various embodiments, such as instructions from players online or off-line, and automatic setting based on some conditions on the game system. The selective items on the game are enough as long as the selection result reflects the game contents somehow. For example, the selective items can be set in accordance with a sectionable unit such as stages, maps, and scenarios on a game.

In one embodiment of the present invention, the present invention may further comprise a common game executing device configured to make a plurality of players play a common game, on condition that the item selected by each of the plurality of players is identical with each other. Thereby, when it is determined that another player having a predetermined connection with the player is selecting a particular item, it is possible to provide a guideline for determination to the player who should determine whether the player selects the identical item to play the common game with the another player, or selects a different item to play a different game.

In the above embodiment, the game system may further comprise a matching device configured to match players with each other on condition that the item selected by each of the players is identical with each other, and the game machine may comprise: a selection executing device configured to present the plurality of selective items to each of the players and make the player select his/her desired item;

and a matching requesting device configured to while providing to the matching device information necessary for specifying the item selected by the player, request matching to the matching device, the selection state presenting device may be configured to provide to the player making the selection, information for determining the item selected by the another player having the predetermined connection and also requesting the matching to the matching device, and the common game executing device may be configured to make the players play the common game, the players being matched with each other by the matching device in response to the request from the matching requesting device. Thereby, the player can get to know which item is being selected by the another player having a predetermined connection with himself/herself by information provided from the selection state presenting device. When the player selects the item indicated by the information, there is a possibility that the player is matched with the another player having the connection with the player and can play the common game with the another player, and when the player selects an item different from an item indicated by the information, the player is not matched with the another player having the connection with himself/herself and can play a common game with a player other than the another player.

In one embodiment of the present invention, the game system may further comprise an interaction service providing device configured to provide a communication site via the network to the players having the predetermined connection. According to this embodiment, when each of the players plays the game, the players having a relation so as to communicate each other via a network, the player gets to know the selection state of the another player who communicates the player as a guideline for selection. For example, in the case that players connected with each other through an interaction service such as a social networking service desires to select an identical selective item to play a game competitively, or cooperatively, it is possible to provide to the players a guideline for realizing the desire.

Further, a terminal apparatus for personal use being used by the player as a user may be connectable to the network, and the interaction service providing device may be configured to provide the communication site to the user of the terminal apparatus. According to this embodiment, when the users communicating each other with the terminal apparatus for personal use play the game as the players, it is possible to provide to the players a guideline for improving communication on the game in such a way that by selecting an identical selective item, the players can play the game competitively or cooperatively.

The terminal apparatus for personal use is at least a terminal apparatus which is given or rented to the user on the premise of personal use regardless of whether or not compensation is received, and connectable to a network. It does not matter what is called. For example, various kinds of personal information communication terminal apparatuses such as a personal computer, a game machine for family use, and a portable phone (including a so-called smart phone) can be employed as the terminal apparatus for personal use of the present invention.

Further, the interaction service providing device may be configured to set the predetermined connection based on instructions of the user from the terminal apparatus. According to this embodiment, it is possible to utilize the connection between the users as a guideline for selection at the moment when the users play the game as players, the connection having been set by the users who accessed the network from their terminal apparatuses.

Effects of Invention

As described above, according to the present invention, when a player selects one of selective items on a game, the player can get to know the selection state pertaining to the other players having a predetermined connection with the player. Therefore, the player can select, by using the selection state as a guideline, identical item or different item on purpose. Accordingly, it is possible to provide a felicitous guideline for selection of item to the player.

DESCRIPTION OF EMBODIMENTS

Figure 1:
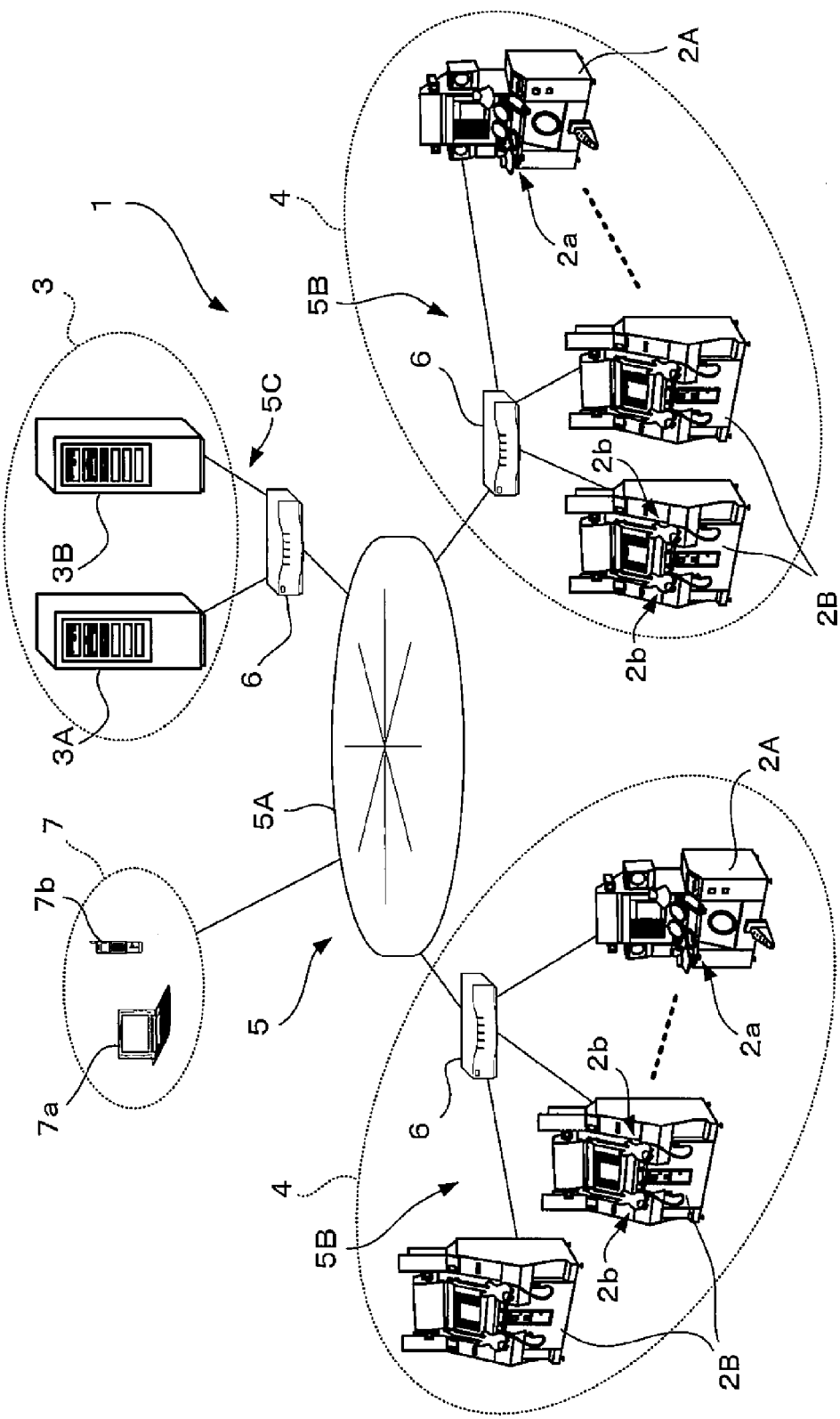
FIG. 1 is a diagram showing an entire game system according to one embodiment of the present invention.

First, in reference to FIG. 1, there will be described an entire configuration of a game system according to one embodiment of the present invention. The game system 1 includes a plurality of game machines 2A and 2B and a group of servers 3 as a server apparatus. Each of the game machines 2A and 2B is configured as a music game machine which requires a player to perform a series of operations, makes a sound depending on the operations of the player, and evaluates the operations of the player based on a relation between required operations and the operations actually performed by the player.

The game machine 2A has an operation portion 2a simulating a set of drums as an instrument, and the game machine 2B has two operation portions 2b each of which simulates a guitar as an instrument. The game machine 2A is configured so that only one player operates the operation portion 2a. On the other hand, the game machine 2B is configured so that one player operates one of the operation portions 2b and the other player operates the other one of the operation portions 2b. That is, the game machine 2B has a configuration where two players can play a game at the same time. Of course, also, only one player is allowed to play a game at the game machine 2B. Hereinafter, the game machine 2A is sometimes referred to as a drum game machine 2A, and the game machine 2B is sometimes referred to as a guitar game machine 2B. In addition, when it is not necessary that the game machines 2A and 2B are distinguished from each other, each of them is sometimes referred to as "the game machine 2".

Each game machine 2 is configured as a game machine for commercial use (business use), which is installed into a commercial facility such as a store 4 or the like, and allows a player to play a predetermined range of game in exchange of payment of game-play fee. In this specification, a person who is provided with service by the game system 1 is collectively called a user, and especially in the case that the user plays a game at the game machine 2, the user is sometimes referred to as a player. Appropriate number of game machines 2 are installed in each store 4. In an example of FIG. 1, both of the drum game machine 2A and the guitar game machine 2B are installed in a mixed state to each store 4. However, there may be some of stores 4 where only one type game machine 2 within the drum game machine 2A and the guitar game machine 2B is installed.

The group of servers 3 is installed by an operator of the game system 1, and includes a game server 3A and a Web server 3B. Each of the game server 3A and the Web server 3B may be configured by an independent physical-computer apparatus, or each of the game server 3A and the Web server 3B may be logically configured on one physical computer apparatus. Alternatively, at least one of the game server 3A and the web server 3B may be configured as one logical server 3A or 3B which is configured by plural physical computes. As one example, the server 3A and 3B may be configured by the cloud computing.

The game machine 2 and the group of servers 3 are connected communicably with each other via a network 5. The network 5 includes a WAN (Wide Area Network) 5A, a LAN (Local Area Network) 5B which is configured for each store 4 and includes the game machines 2 in each store 4, and a LAN 5C which includes the group of servers 3 and connects the servers 3A and 3B with each other. As one example, the internet which realizes network communication using the TCP/IP protocol is employed as the WAN 5A. Each of the LANs 5B and 5C is also configured as the intranet using the TCP/IP protocol. Each of the LANs 5B and 5C is connected to the WAN 5A via a router 6. In addition, a local server may be installed between the game machines 2 and the router 6 in a store 4, and the game machines 2 may be communicably connected with the group of servers 3 via the local sever. The group of servers 3 can be configured using the WAN 5A instead of or in addition to the LAN 5C.

The group of servers 3 provides various kinds of service via the network 5 to a game machine 2 or a user (player) of the game machine 2. The game server 3A is installed for a main aim to provide various kinds of game service to a game machine 2 or a player thereof. As one example, the game server 3A provides: an updating service for a program and data for a game, the updating service being provided via the game machine 2; a service of verifying a user of the game machine 2, accepting from the game machine 2 and storing game-play data which includes game-play history of the user and the like, of providing to the game machine the game-play data; and a matching service between users which is provided when the users play a common game via the network 5. On the other hand, the Web server 3B is installed for a main aim to provide a user terminal 7 accessing via the network 5, with various kinds of Web services. The Web service includes services such as: a service of providing via the Web site, a user with various kinds of information pertaining to a game; and a community service of providing a communication site where users can transmit, exchange, and share some information. When a computer unit functions as a personal communication terminal apparatus which is connectable with a network such as a personal computer (hereinafter referred to as "the PC" for short) 7a and a portable phone (including a smart phone) 7b, the computer unit can be used adaptively as the user terminal 7.

The group of servers 3 includes a charge server which charges a fee in compensation for providing pay service to a user who has accessed from the game machine 2 or the user terminal 7, and collects the fee in accordance with operations by the user. However, the illustration about the charge server is omitted. The charge server collects the fee by exchange of electronic information. For example, a service fee is collected by means of withdrawal with virtual money, clearing by a credit card and the like. The charge server may charge and collect a game-play fee for the game machine 2.

To each of the game machine 2 and the servers 3A and 3B, given is an IP address which is unique to identify each of them on the network 5. In the communication between the game machines 2 or between the game machine 2 and the server 3A or 3B, a party of communication is specified by using the IP address. In the case that the WAN 5A is an open network like the internet, a unique fixed address is set for each router 6 on the WAN 5A. A private address is set as the IP address, the private address being combined with the fixed address to identify uniquely each game machine 2 on the network 5. In this case, a virtual private network (VPN) is configured between the game machine 2 and the server 3A or 3B, or between the game machines 2. Each game machine 2 is specified uniquely by using the private address on the VPN. Also, an IP address is given to each user terminal 7 for identifying uniquely each user terminal 7 on the network 5. The IP address may be a dynamic address which is varied for each connection to the network 5, or may be a static fixed address. Hereinafter, information for identifying on the network 5 each of the game machine 2, the servers 3A and 3B, and the user terminal 7 is referred to as the address information. In the communication via the network 5, unless otherwise noted, it is premised that a party of communication is specified based on the address information.

Figure 2:
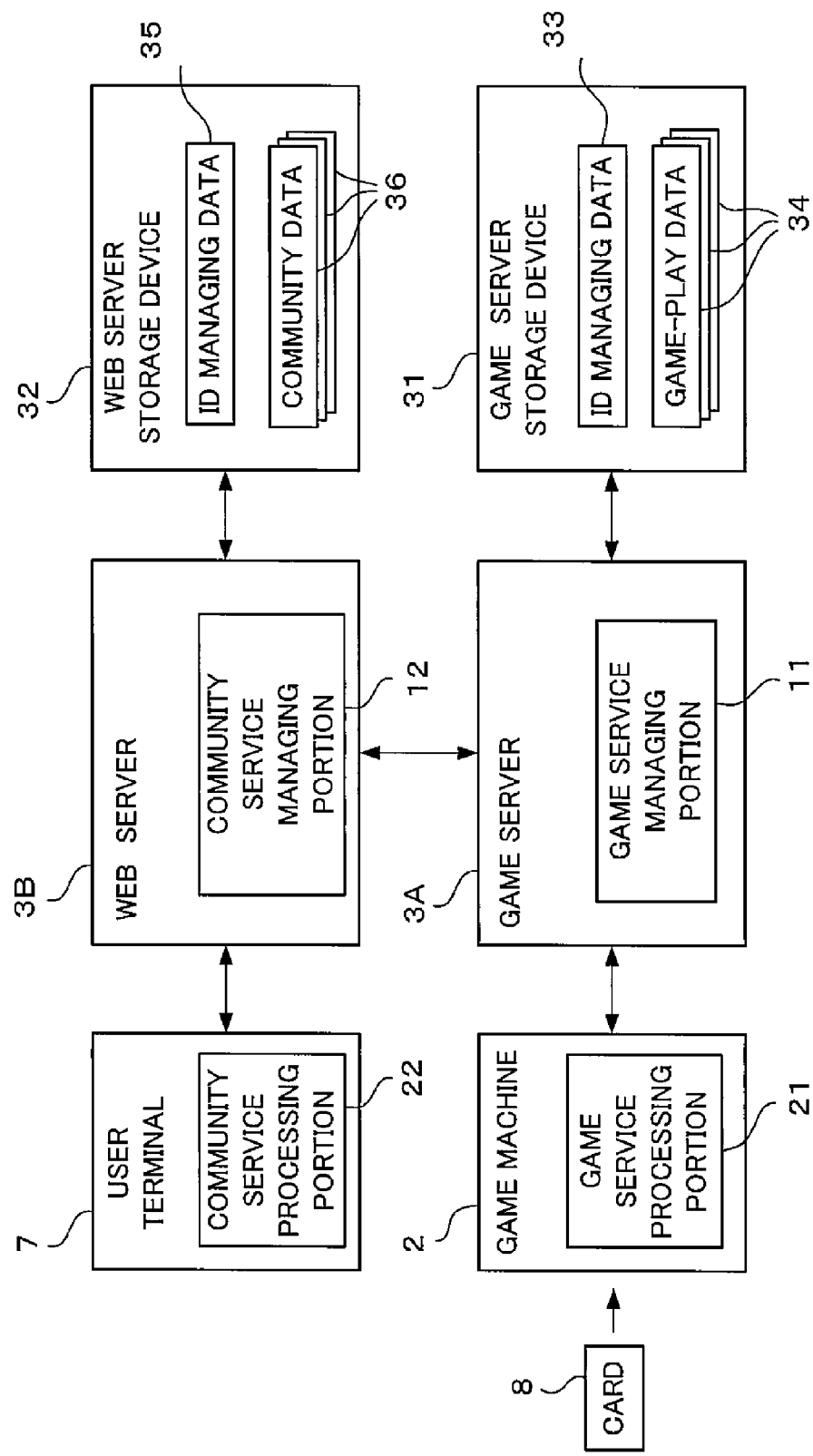
FIG. 2 is a functional block diagram showing an essential part of the game system.

FIG. 2 is a functional block diagram showing a main portion of the game system 1. Pertaining to the game machine 2, only a single type game machine 2 is shown on the premise that the game machines 2A and 2B have a common function basically without consideration of concrete differences existing between the drum game machine 2A and the guitar game machine 2B in the operation portions 2a and 2b, the game programs corresponding to the operation portions 2a and 2b respectively and the like.

In the game system 1, to the game server 3A, provided is a game service managing portion 11 for providing various kinds of game service to the game machines 2. To the Web server 3B, provided is a community service managing portion 12 for providing various kinds of community service to users of the game system 1. These managing portions 11 and 12 are logical devices which are realized by combination of computer units configuring the group of servers 3 and software. To the game machine 2, provided is a game service processing portion 21 for realizing game service in cooperation with the game service managing portion 11 of the game server 3A. To the user terminal 7, provided is a community service processing portion 22 for realizing community service in cooperation with the community service managing portion 12 of the Web server 3B. These processing portions 21 and 22 are logical devices which are realized by combination of: computer units composing the game machine 2 and the user terminal 7; and software. The community service managing portion 12 of the Web server 3B and the community service processing portion 22 of the user terminal 7 are an interaction service providing device which provides users with a communication site where information is transmitted, exchanged and shared; and associates are made for users, the communication site being realized by communication service publically known such as the social networking service (SNS). The functions of these portions 12 and 22 can be realized by using software installed into each of a Web server 3B and a user terminal 7 in a communication service publically known.

The game server 3A and the Web server 3B are provided with storage devices 31 and 32 respectively. In the storage device 31 for the game server 3A, ID managing data 33 and a group of pieces of game-play data 34 are stored. In the storage device 32 for the Web server 3B, ID managing data 35 and a group of pieces of community data 36 are stored. The ID managing data 33 and 35 is data for managing correlations between various kinds of IDs which are set as information necessary to specify each user. The kinds of IDs and a management way of IDs may be set felicitously as long as each user can be specified. One example thereof is as follows. First, the game machine 2 specifies a user by using a card 8. In the card 8, a card ID which is unique for each card is recorded. The game machine 2 has a function of reading the card ID recorded in the card 8 to transmit the card ID to the game server 3A. On the other hand, the game server 3A specifies a user by using a user ID given uniquely to each user. In the ID managing data 33, the correlations between the card IDs and the user IDs are described. The game server 3A specifies, based on the ID managing data 33, the user ID corresponding to the cared ID transmitted from the game machine 2. In the case that two players operate a single guitar game machine 2B at the same time, the card ID for each of the two players is read and transmitted to the game server 3A.

While the Web server 3B also manages users by using the user IDs, pertaining to the community service, the Web server 3B manages users by correlating each user ID with a community ID which is issued separately from the user ID. In the ID managing data 35, the correlations between the user IDs and the community IDs are described. The Web server 3B can specify, by referring to the ID managing data 35, the user ID corresponding to the community ID, and the community ID corresponding to the user ID. In this way, it is possible to specify the correlation between all IDs, by referring to the ID managing data 33 and 35 as necessary. Pertaining to the correlation between the card ID and the user ID and the correlation between the user ID and the community ID, it is possible to set a new correlation and change the correlation set, by accessing a user management site of the Web server 3B from the user terminal 7. In addition, a further ID may be intervened between these IDs. While only one user ID is issued for a single user, plural card IDs and community IDs may be issued for a single user. In this case, by making a user specify one of card IDs and one of community IDs as effective IDs to the user ID, it is possible to maintain the correlation such that, when any one of the card ID, the user ID and the community ID is determined, the other IDs are determined uniquely. Hereinafter, it is assumed that one card ID and one community ID are correlated to one user ID. It is possible to set a nickname of a user to each of the user ID and the community ID, and the nickname correlated to each of the user ID and the community ID is further registered in the ID managing data 33 and 35. Personal information such as user's name and address is further correlated to the user ID.

The game-play data 34 is data where various kinds of information which should be referred to at the moment when a user plays a game at the game machine 2 is recorded, and generated for each user ID. For example, the following information: game-play history at the game machine 2; and a rank or a level of a user which is set according to the game-play result are recorded in the game-play data 34. On the other hand, the community data 36 is data where various kinds of information which should be referred to at the moment when a user uses the community service are recorded, and generated for each community ID. In the community data 36, recorded is information such as: information for specifying other users registered by the user as his/her associates such as the community ID and the nicknames; and log of comments transmitted from the user to the associates or received from the associates. "The associate" is a term which is used as a concept indicating that a predetermined human connection exists between users. The associate includes two types: "a group"; and "a friend". In the community data 36, information necessary for specifying another user registered by the user as the group the user belongs to or as the friend is recorded in a felicitous form. For example, the community ID of the another user within the same group and the community ID of the another user set as the friend may be described in the community data 36 so as to be correlated with the community ID of the user. The steps of setting and registering the associates are, as with those of a general community service, the following: the user terminal 7 accesses the Web server 3B to transmit an invitation for the associate to the another user; or the user terminal 7 applies for register of the associate to the Web server 3. The detailed explanation thereof is omitted. However, the register of the associate to the community data 36 is not always executed online via the network 5. The register may be applied offline, and the operator of the group of servers 3 may describe the applied contents in the community data 36 at a felicitous timing.

In addition to the data 33 to 36 mentioned above, various kinds of data are prepared in the game system 1. For example, in the storage device of the game system 2, as data necessary for executing a music game, tune data for playing and outputting tunes, sequence data for instructing a player to perform a series of operations to the tune, image data for creating a game image, and the like are recorded. As it is enough that these types of data are prepared as with existing music game machines, detailed explanation thereof is omitted. In the game machine 2, a plurality of tunes are prepared as selective items of a game in advance. A player selects one tune from a plurality of tunes existing in a selectable range, and can play a game according to the tune selected.

In the game system 1, there is a game mode such that three players play a game with a common tune so that an experience similar to a music session is provided to them. Hereinafter, this mode is referred to as a session play mode. The session play mode corresponds to a common game of the present invention. In the session play mode, one tune is executed as one playing unit. The session play mode includes a local session which is realized by participation of three players with game machines 2 in the same store 4, and an online session which is realized through matching processing by the game server 3A. The online session includes the case that two or three players in the same store 4 are matched with each other in the result of the matching processing by the game server 3A. Hereinafter, matching players between the game machines 2 in the same store 4 is referred to as a local matching, and matching players by the game server 3A is referred to as an online matching. The players matched with each other by the local matching are sometimes referred to as local members, and the players matched with each other by the online matching are sometimes referred to as online members.

Matching steps of a case that the game is played in the session play mode are generally as follows. In the game system 1, when a player desires to start the game in the session play mode, firstly the game machines 2 in the same store 4 communicate with each other to attempt the local matching. In the case that three players collect by the local matching, the local session is started without execution of the online matching. On the other hand, in the case that three players do not collect by the local matching, the online matching is requested from the game machine 2 to the game server 3A and the online matching is attempted by the game server 3A. In the online matching, deficient players in the local matching are detected in accordance with predetermined matching conditions. In the online matching, players who satisfy the matching conditions are detected from players of all game machines 2 connected to the game server 3A via the network 5. When the deficient players are detected in the online matching, the online matching completes and the online session is started by the players matched with each other. In the case that the session play mode is continued over plural tunes, the local member is maintained continuously until the mode ends. On the other hand, the online member is maintained while only one tune is played, and the online member is released when game-play of one tune ends. For the next tune, the online matching is attempted newly. Pertaining to the communication between the game machines 2 of the players matched with each other by the local matching, any one of the game machines 2 controls the communication as a master machine. As with the communication between the game machines 2, the master machine also controls the communications between the game machine 2 and the group of servers 3, and between the game machine 2 and a game machine 2 in the other store.

Hereinafter, referring to FIGS. 3 to 8, various kinds of processing executed in the game system 1 in relation to the local matching and the online matching will be explained in detail. Although the following processing is realized in cooperation with the game service processing portion 21 of the game machine 2, the game service managing portion 11 of the game server 3A, and the community service managing portion 12 of the Web server 3B, in order to simplify explanations, in the following explanations the subjects which execute the processing are sometimes referred to as the game machine 2, and the server 3A or 3B.

Figure 3:
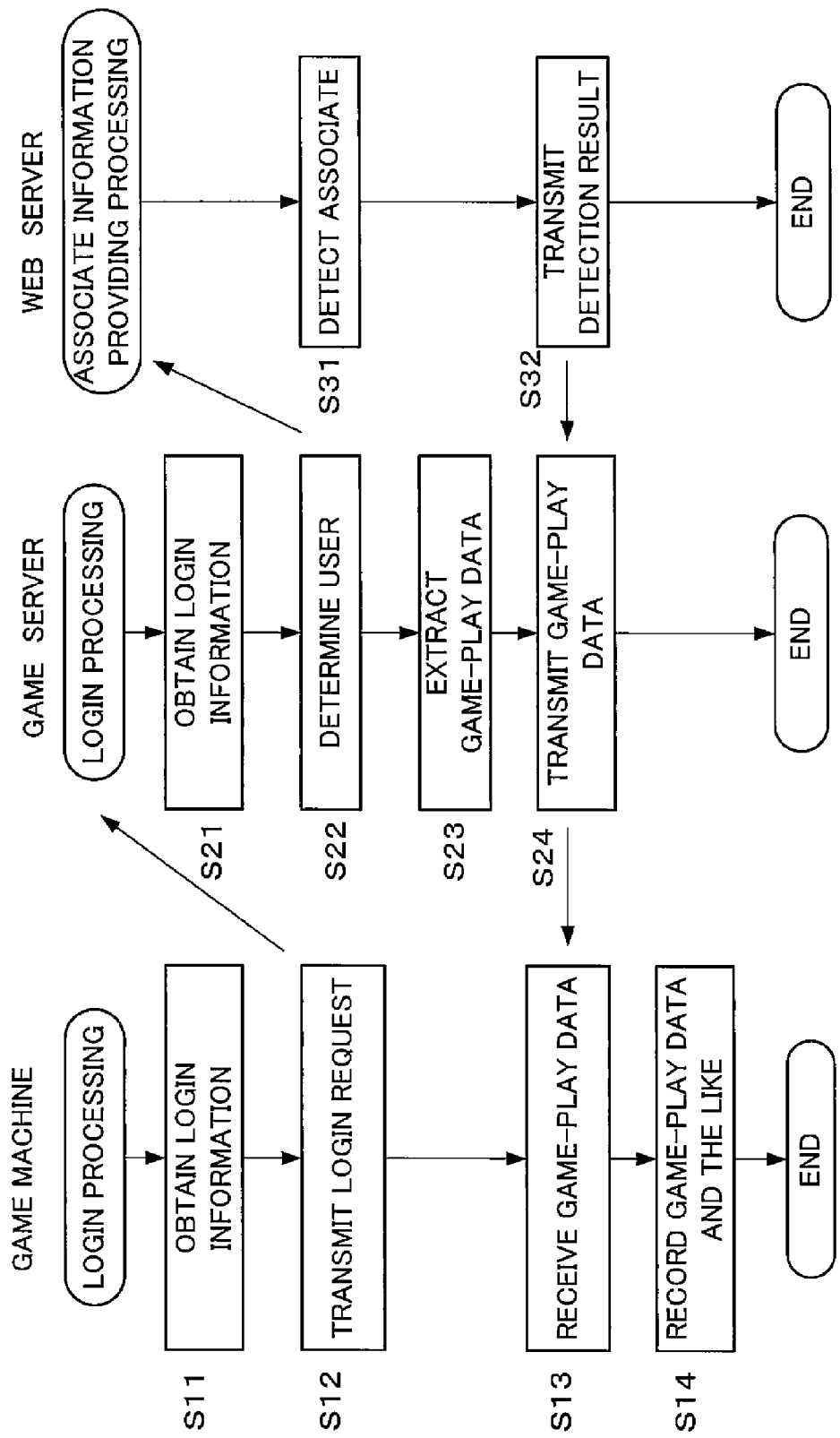
FIG. 3 is a flow chart showing steps of login processing and the like executed at the moment when a player starts a game.

First, the login processing (verification processing) to be executed at the moment when a player starts the game at the game machine 2 will be explained with FIG. 3. When the player requests the login to the game machine 2, the game machine 2 starts the login processing. The game machine 2 first requests the player to perform a reading operation of the card 8, detects the reading operation in response to the request, and obtains from the card 8 information (login information) necessary for the login (step S11). The information necessary for the login includes at least the card ID. Subsequently, the game machine 2 transmits the login information obtained to the game server 3A to request the login processing for the player (step S12). In response to this, the game server 3A also starts the login processing. The game server 3A first obtains the login information transmitted from the game machine 2 (step S21). Subsequently, the game server 3A determines the user ID corresponding to the card ID which is included in the login information, referring to the ID managing data 33 (step S22). At this time, the game server 3A informs the Web server 3B of the user ID, and requests the Web server 3B to transmit information of associates corresponding to the user ID. In response to this, the Web server 3B starts associate information providing processing where the Web server 3B obtains the community ID correlated with the user ID received from the ID managing data 35, and detects information of the associates registered in the community data 36 in association with the community ID obtained, the information including, for example, the community ID of the user registered as the group, and the community ID of the user registered as the friend (step S31). After that, the Web server 3B transmits to the game server 3A the detected information of the associates (step S32), and then ends the associate information providing processing.

In parallel with the associate information providing processing of the Web server 3B, the game server 3A extracts the game-play data 34 corresponding to the user ID determined at step S22 (step S23). After that, the game server 3A transmits the extracted game-play data 34 to the game machine 2 from which the login request is transmitted (step S24). At this moment, the game server 3A transmits to the game machine 2 the information of associates transmitted from the Web server 3B, together with the game-play data 34. The game machine 2 receives the game-play data 34 and the information of associates transmitted from the game server 3A (step S13), and records them in an inner storage device thereof (step S14). Then, the login processing ends. When the login processing completes, the player can play the game on the game machine 2 following the previous game-play. In addition to that, the information (the community ID and the like) for specifying a group or a friend set by the player as his/her associate in the community service is also held in the game machine 2. In the above description, the group of servers 3 provides the game machine 2 with the community ID as the information of associates. However, the game server 3A may converse the community IDs of his/her associates to the user IDs in accordance with the ID managing table 35, and provide the game machine 2 with the user IDs as the information of associates. When two players play the game at the guitar game machine 2B, the login processing above mentioned is executed for each player.

Figure 4:
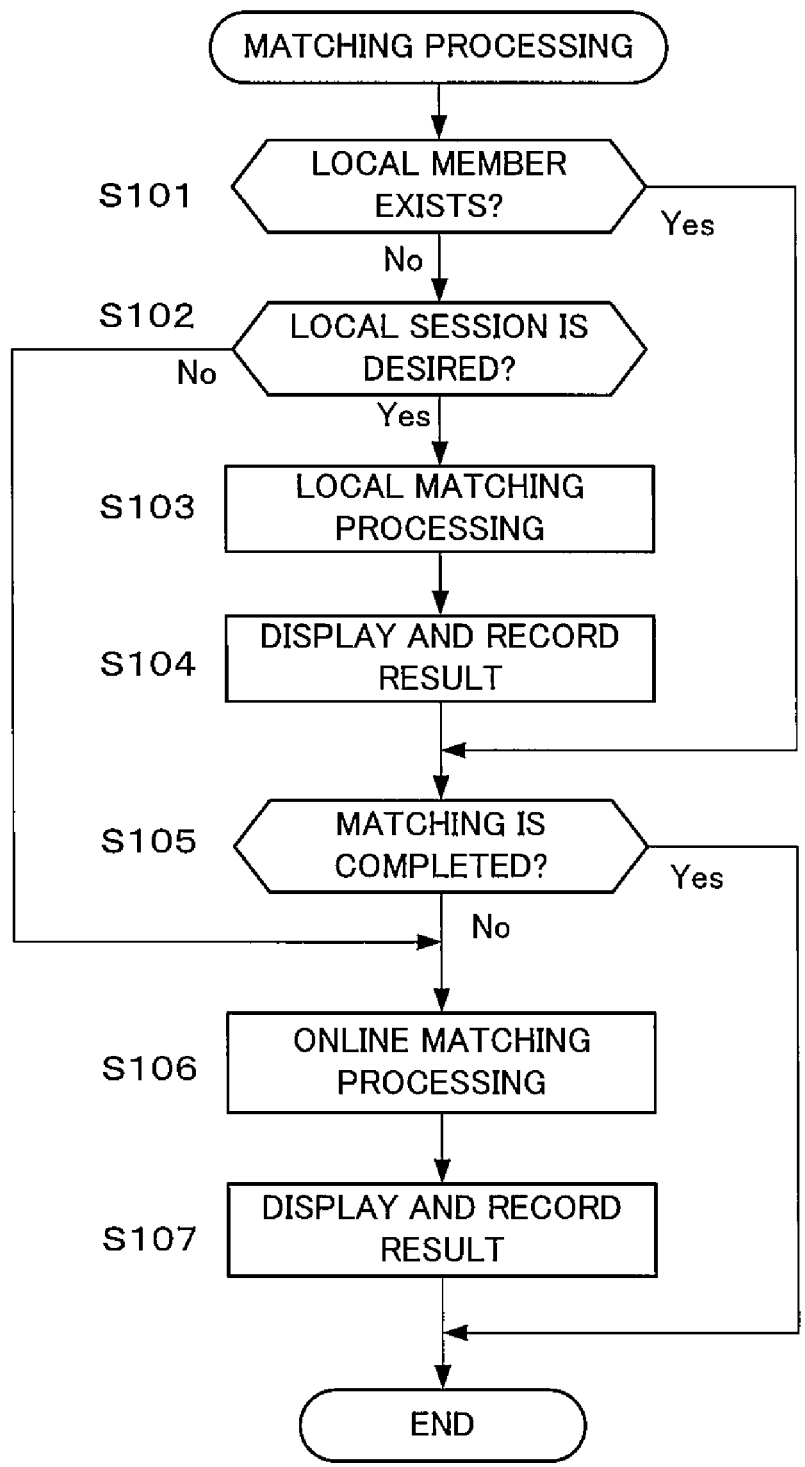
FIG. 4 is a flow chart showing steps of matching processing executed by a game machine.

FIG. 4 shows matching processing to be executed by the game machine 2 for matching the local members or the online members. The matching processing is executed each time a player plays the game for one tune. In addition, the matching processing is executed in a state that the login processing above mentioned shown in FIG. 3 has been completed. When starting the matching processing shown in FIG. 4, the game machine 2 firstly at step S101, determines whether a local member exists pertaining to the player of the game machine 2. In the case that after completing the login processing the player plays the game in the session play mode for the first tune, a negative determination is made at step S101 since the local matching is incomplete. On the other hand, once the local members are formed after the login processing, the local members are maintained until the session play mode ends. Therefore, in the case that the game for the second or later tune is played in the session play mode, an affirmative determination is made at step S101.

When the negative determination is made at step S101, the game machine 2 goes to step S102 to determine whether or not the player of the game machine 2 desires to play the local session. In the case that the player desires to play the local session, the game machine 2 goes to step S103 to execute the local matching processing. The local matching processing is executed in accordance with the following steps: the game machine 2 notifies a request for the local matching to the other game machines 4 in the same store 4: when there is another game machine 2 requesting the local matching, a master machine and a slave machine are determined between those game machines 2; and the master machine specifies the players who should form the local members and the players' game machines 2 and notifies the matching result to the slave machine.

After completing the local matching processing, the game machine 2 goes to step S104 to display the result of the local matching processing to the player and store the result in the storage device thereof. Subsequently at step S106, the game machine 2 determines whether the matching has completed or not, that is, whether three players has collected or not by the local matching. In the case that two players play the game at a single guitar game machine 2B, one of the players plays the game on a tune selected by the other player. This case is treated as a case such that there have been already two players who desire to play the local session pertaining to the guitar game machine 2B. In this case, if one player of the drum game machine 2A or the guitar game machine 2B in the same store 4 desires to play the local session, it is determined that the local matching has completed by those three players. In the case that an affirmative determination is made at step S101, the steps S102 to S104 are skipped and the step S105 is executed. In this case, if the number of local members which have been already formed is three, it is determined that the matching has completed. In the case that the number of local members which have been already formed is two or less, it is determined that the matching is incomplete.

In the case that it is determined that the matching has completed at step S105, the game machine 2 skips the steps S106 to S108 and ends the matching processing. On the other hand, in the case that it is determined that the matching is incomplete at step S105, the game machine 2 goes to step S106 to execute the online matching processing. Namely, when players the number of which is necessary for the session play mode (three players) have not collected, the game machine 2 requests the game server 3A to execute matching for the deficient number of players. In the case the players of two game machines 2 are matched with each other by the local matching, one of the game machines 2 requests the online matching to the game server 3A as the master machine, and the other one of the game machines 2 follows as the slave machine the instructions from the master machine. The details of the online matching processing will be described later. When the online matching processing completes, the game machine 2 displays the result of the processing to the player and stores the result in the storage device thereof. After that, the game machine 2 ends the matching processing. In the case that three players are matched with each other in the local matching, the local session is started. On the other hand, in the case that three players are matched with each other by the online matching, the online session is started.

Figure 5:
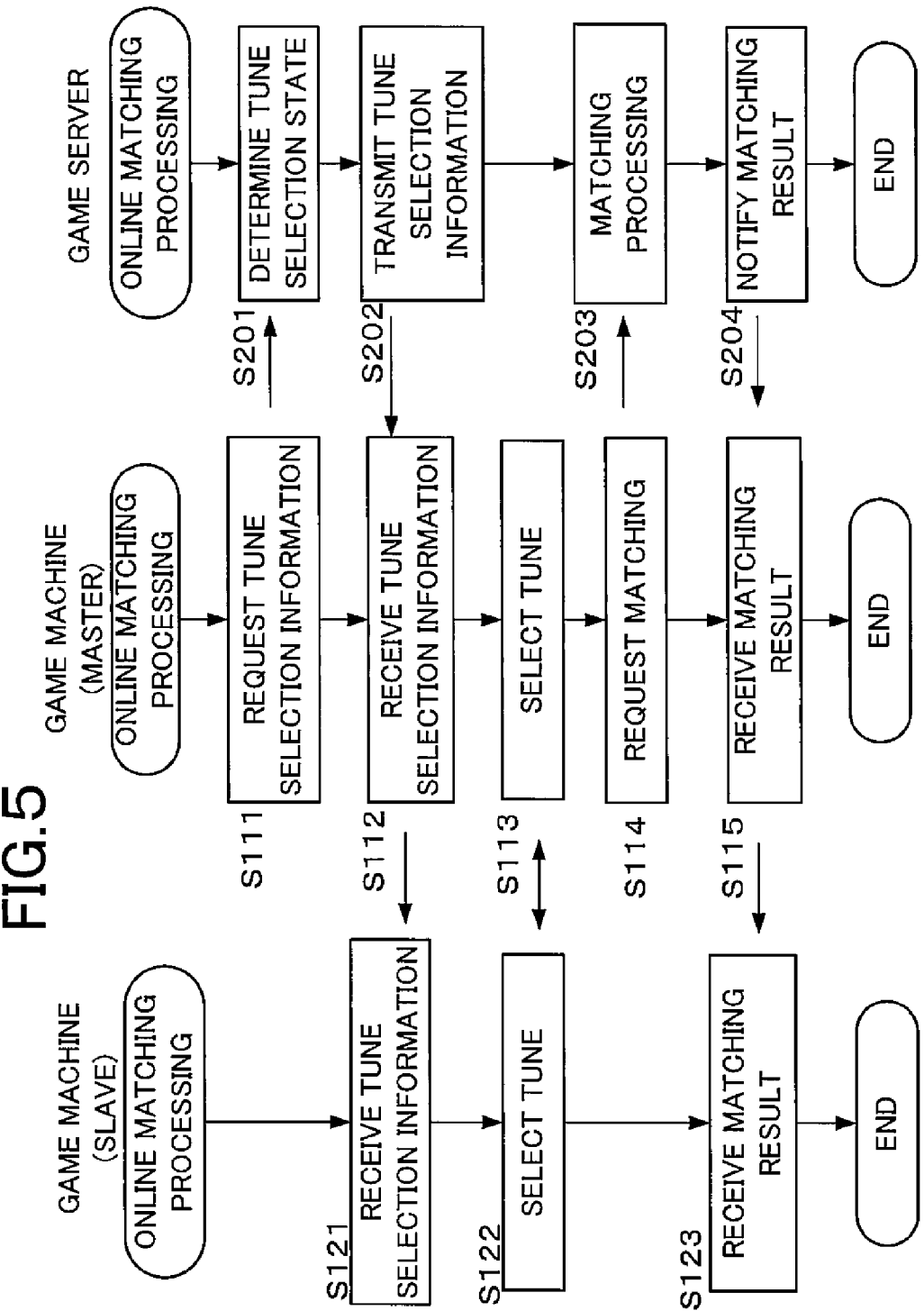
FIG. 5 is a flow chart showing steps of online matching processing.

FIG. 5 shows the online matching processing (the step S106 of FIG. 4) executed by the game machine 2 and the processing executed by the group of servers 3 in response to the online matching processing by the game machine 2. In the online matching processing of the game machine 2, the master machine is different from the slave machine. Therefore, in FIG. 5, the processing to be executed by the game machine 2 is shown in a distinctive manner between the master and the slave. In the following explanation, the game machine 2 is sometimes represented in a distinctive manner between the master machine 2m and the slave machine 2s.

In the online matching processing, at step S111, the master machine 2m requests the game server 3A to provide tune selection information as preparation for requesting the online matching to the game server 3A. The tune selection information is one part of information necessary for specifying the tune selection state of the user registered by the player as the player's associate by utilizing the community service. When receiving the request from the master machine 2m, the game server 3A starts the online matching processing shown in FIG. 5. Firstly at step S201, the game server 3A determines the tune selection states of all players who are requesting the online matching at the moment. Namely, in the matching request from the game machine 2 (step S114 which will be described later), the information specifying the tune selected for the session is provided from the master machine 2m to the game server 3A, and the players who have selected an identical tune are matched with each other. Accordingly, the game server 3A can obtain the tune selection states of all players who have requested the online matching. Therefore, in the case that the transmission of the tune selection information is requested from the master machine 2m as part of the online matching processing, the game server 3A detects information specifying all players who are requesting the online matching at the moment and information specifying tunes being selected by the players. When determining the tune selection states at step S201, the game server 3A goes to step S202 to generate the tune selection information (the information specifying the tunes and players who has selected the tunes) corresponding to the determination result and transmits the tune selection information generated to the master machine 2m.

The master machine 2m receives the tune selection information at step S112, and subsequently at step S113, makes the player select his/her desired tune for the session. At this moment, it is determined whether there is or not any associate of the player waiting for the online matching based on the tune selection information received at step S112 and the information of the associates obtained at the login processing. In the case that there is the player's associate, the tune being selected by the associate is determined. Namely, at the login processing, as information specifying a user registered by the player as his/her associate (the group or the friend), the community ID or the user ID of the user has been provided to the game machine 2. Accordingly, the master machine 2m can determine whether or not the ID of the associate (the community ID or the user ID of the associate) of the player of the master machine 2m is included in the tune selection information provided from the game server 3A. When the ID of the associate is included, the tune being selected by the associate can be determined by referring to the tune selection information. Then, in the case that there is the associate whose ID is included in the tune selection information, some information for determining the tune selected by the associate is presented to the player. In addition, the tune selection information received at step S112 may be further provided to the slave machine 2s. In this case, the slave machine 2s receives, at step S121, the tune selection information from the master machine 2m, and subsequently executes tune selection processing in cooperation with the master machine 2m at step S122.

Figure 6:
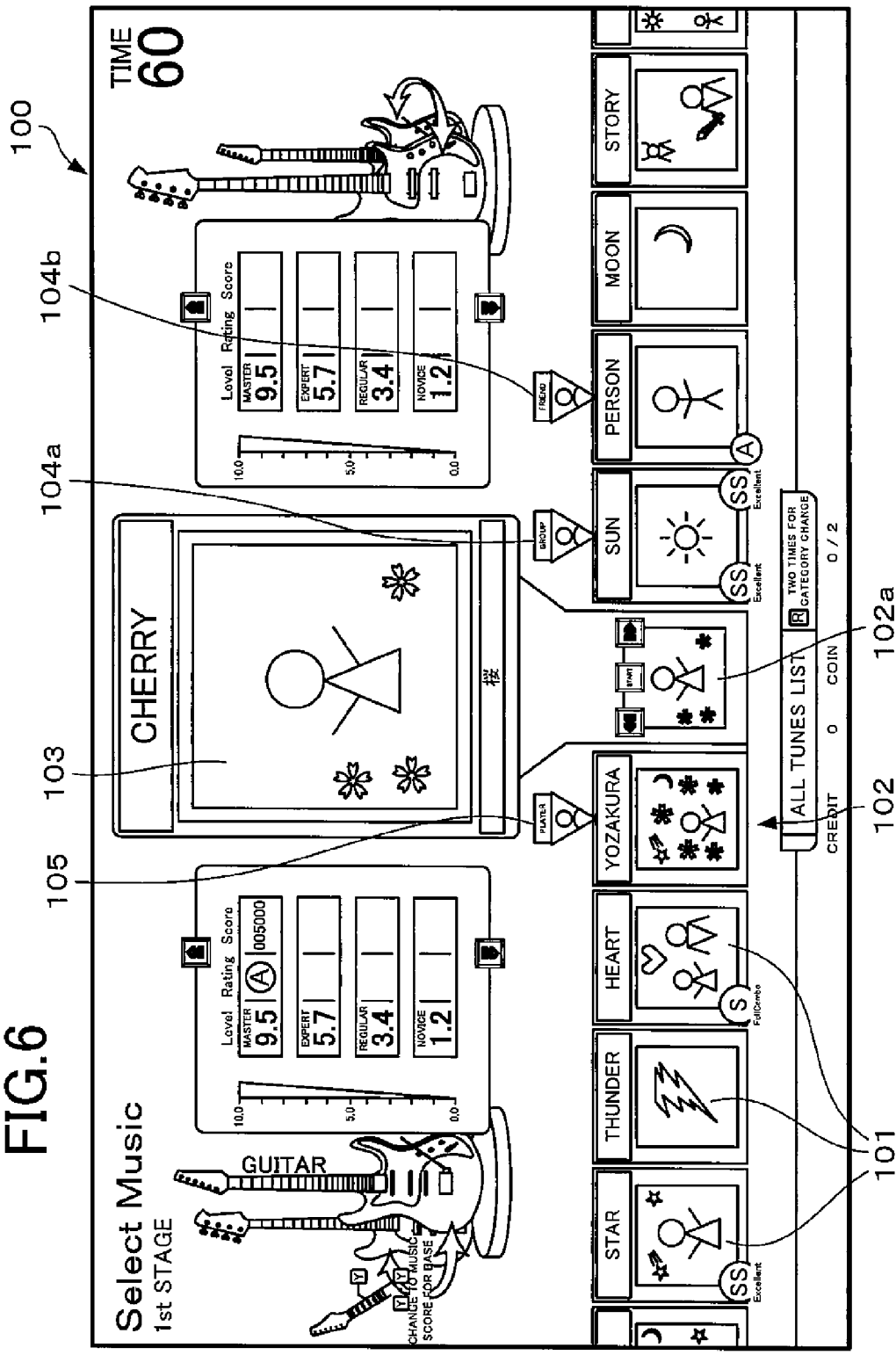
FIG. 6 is a diagram showing one example of tune selection image where a tune selection state of a player who is one of members is displayed.

FIG. 6 shows an example that the information for determining the tunes being selected by the associates is displayed on the tune selection image 100 which is displayed at the game machine 2. This image 100 is one image example which should be displayed at the guitar game machine 2B. In the tune selection image 100, title images 101 representing tunes which can be selected by the player are displayed so as to be aligned to form a title column 102 in the right-left direction. The title column 102 is scrolled in the right-left direction in response to a predetermined selection operation to the operation portion 2b. A provisionally selected portion 102a is provided at the center of the title column 102. The title image 101 existing at the provisionally selected portion 102a is enlarged in an enlarged display portion 103 existing above the portion 102a. In the title column 102, as a mark for determining the tune being selected by a player as the associate, a group icon 104a and a friend icon 104b are displayed. The group icon 104a indicates the tune being selected by another player included in a group where the player of the game machine 2 belongs. The friend icon 104b indicates the tune being selected by another player registered as the friend by the player of the game machine 2. In this way, since the information for determining the tunes being selected by the associates is presented, the player can get to know the possibility that if he/she selects a tune where the icon 104a or 104b is displayed, it is possible to be matched with the associate in the online matching and perform the online session with the associate. Thereby, it is possible to assist to realize the online session by the associates formed by using the community function. Alternatively, the player also expects to be matched with a player who is not his/her associate in the online matching, by selecting a tune different from the tunes being selected by the associates on purpose.

In addition, in the case that the tune selection information is also provided to the slave machine 2s from the master machine 2m, the tune selection image 100 may be displayed not only at the master machine 2m but also at the slave machine 2s. The following construction may be applied: not only the information for specifying a player of the master machine 2m, but also the information for specifying a player of the slave machine 2s is notified to the game server 3A; the tune selection state is determined for each player; and the determination result is included in the tune selection information. In this case, in the tune selection image 100 of the master machine 2m, there may be displayed the icon 104a or 104b indicating the tune being selected by the associate of the player of the master machine 2m, and in the tune selection image 100 of the slave machine 2s, there may be displayed the icon 104a or 104b indicating the tune being selected by the associate of the player of the slave machine 2s. In the case that a tune is selected cooperatively at steps S113 and S122, the following construction may be applied: only the player of the master machine 2m can determine a tune and the selecting process is presented to the player of the slave machine 2s. Alternatively, the following construction may be applied: the player of the slave machine 2s notifies his/her desired tune to the player of the master machine 2m; and the player of the master machine 2m selects a tune referring to the notification. In the case that the tune selection image 100 is displayed at each of the game machines 2 of the local members, there may be displayed a player icon 105 indicating a tune another player desires to select as shown in FIG. 6.

Turning back to FIG. 5, and the explanation is resumed. In the case that a tune is selected at step S113, the master machine 2m goes to step S114 to request the online matching to the game server 3A. At this moment, the information for specifying the tune selected at the master machine 2m is provided from the master machine 2m to the game server 3A. The information for specifying the tune may be, for example, a tune code which is unique for each tune. When the master machine 2m requests the online matching at step 114, the information necessary for specifying all players included in the local members is provided from the master machine 2m to the game server 3A. For example, a card ID is used as such information. In the case that the master machine 2m can specify the user ID of the player of the master machine 2m based on the game-play data 34 provided thereto, the user ID may be notified to the game server 3A. In the login processing, in the case that the community ID of the player is also provided to the game machine 2, the community ID may be provided to the game server 3A in addition to the card ID or the user ID.

Figure 7:
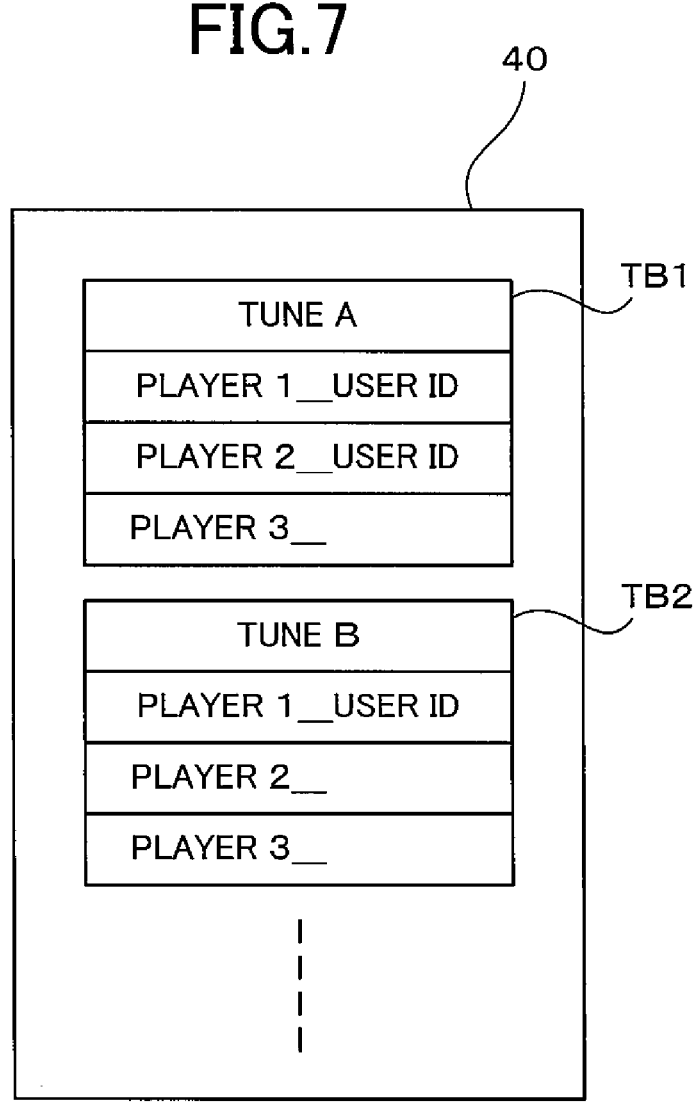
FIG. 7 is a diagram conceptually showing a matching table which is generated at the moment of matching executed by a game server.

The game server 3A to which the online matching has been requested from the master machine 2m goes to step S203 to execute the online matching processing. The processing is executed, as shown in FIG. 7, in accordance with the following steps of: holding a matching table storing area 40 in the inner storage device of the game server 3A; generating in the storing area 40 matching tables TB1, TB2 . . . for each tune; and setting the user IDs of the players who have requested the online matching in the table for the tune corresponding to the request sequentially. When the online matching is requested, in the case that the table for the tune identical with the request has already existed, the user ID of the new player is set in the table, and in the case that the table for the tune identical with the request has not yet existed, a new table for the tune is generated. At the moment of the request of the online matching, in the case that the card IDs of two players are provided from the master machine 2m to the game server 3A, that is, in the case that two players are matched with each other in the local matching, and one deficient player should be found in the online matching, the user IDs of the players composing the local members are set in the same table. FIG. 7 shows a state that only the user IDs are set in the tables TB1 and TB2. However, the community ID corresponding to the user ID may be further recorded. The community ID can be obtained by searching the community data 36 in cooperation with the Web server 3B based on the card ID or the user ID provided by the mater machine 2m. Alternatively, in the case that the game machine 2 obtains the community ID at the login, the master machine 2m may be made to provide the community ID. In addition, the information for specifying a game machine 2 of a player and/or the information for specifying a store 4 where a game machine 2 is installed may be also recorded in the tables TB1, TB2 . . . , if necessary.

Turning back to FIG. 5 and the explanation is resumed. After completing the online matching processing, the game server 3A goes to step S204 to notify the master machine 2m of the result of the online matching processing. In the case that the matching is completed, the user IDs of the players matched, the addresses necessary for specifying the game machines 2 of those players on the network 5, and the like are provided to the master machine 2m. The master machine 2m receives the matching result from the game server 3A at step S115 and provides the matching result to the slave machine 2s. The slave machine 2s receives the matching result at step S123. With that, the online matching processing of the game machine 2 ends. In the case that three players are matched with each other via the online matching processing, in the master machine 2m, executed is the processing for setting communication environment necessary for starting the online session between the game machines 2 of the players who have been matched with each other by the online matching. After that, the online session is started between the game machines 2 who have been matched with each other.

Figure 8:
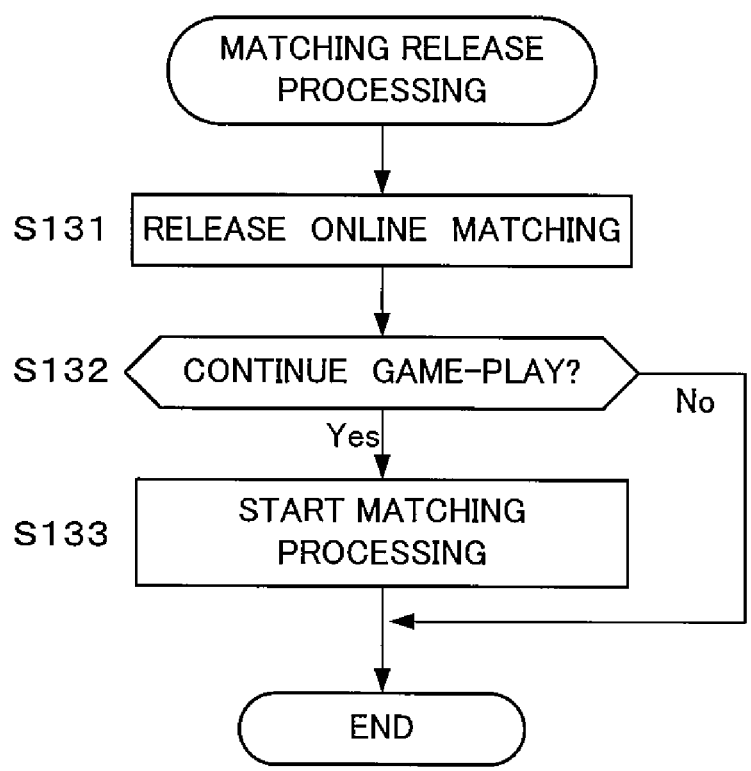
FIG. 8 is a diagram showing matching release processing which is executed by the game machine when game play of one tune ends.

FIG. 8 shows matching release processing which is executed by the master machine 2m when the game-play on one tune by the online session ends. In this processing, the master machine 2m first at step S131, releases the matching by the online matching being formed at the moment. In this processing, deleted is the information pertaining to the setting necessary for communication with a player as the online member and the game machine 2 of the player. Subsequently at step S132, the master machine 2*m* determines whether or not the local member desires to continue playing the game, that is, play the session for a next tune. If he/she desires, the master machine 2*m* goes to step S133 to start the matching processing shown in FIG. 4. After that, the master machine 2*m* ends the processing shown in FIG. 8. When the matching processing of FIG. 4 is started, if the local members have been already formed, an affirmative determination is made at the step S101. In the case that the local member does not desire to continue playing the game at step S132, the master machine 2*m* skips step S133 to end the processing in FIG. 8. In this case, the master machine 2*m* executes a predetermined processing necessary for ending the game.

As mentioned above, according to the game system 1 of the present invention, when the player selects one of tunes, the tune selection state of the another player having a human connection that is "the associate" to the player is determined and presented to the player. Accordingly, the player can refer to the selection states of his/her associates as a guideline for selecting his/her desired tune from a lot of tunes. Thereby, it is possible to increase the chance for enjoying the online session on the identical tune with the associates, and also possible to provide the player a fun such that the player can play the online session with players other than his/her associates by selecting on purpose a tune not being selected by the associates.

As the players set as "the associates" can interact with each other on the network 5 by using the terminal apparatuses 7, it is possible to enhance the connection of them through game-play in a common game. Thereby, it is possible to give a motivation for playing a game at a game machine to a lot of users, by utilizing human relation, easiness of configuring a human network, and easiness of expansion which are features of a social service on a network such as a social networking service.

In the above embodiment, the community data 36 corresponds to the relation data of the present invention, the game service managing portion 11 of the game server 3A functions as the selection state determining device of the present invention by executing the step S201 shown in FIG. 5. The game service managing portion 11 of the game server 3A and the community service managing portion 12 of the Web server 3B function as the relation determining device by specifying the associates in cooperation with each other at steps S21, S22, S31 and S32 shown in FIG. 3. The game service processing portion 21 of the game machine 2 functions as the selection executing device of the present invention by presenting the tune selection image 100 to the player and making the player select a tune at step S113 shown in FIG. 5, and also at step S113, functions as the selection state presenting device of the preset invention by determining the tunes which are being selected by the associates based on the tune selection information and the information of the associates, and displaying the icons 104*a* and 104*b* on the tune selection image 100 for the tunes determined. The game service processing portion 21 of the game machine 2 functions as the matching requesting device by requesting the matching at step S114 of FIG. 5, and the game service managing portion 11 of the game server 3A functions as the matching device of the present invention by executing the step S203 in response to the request of step S114. Further, the game service processing portion 21 of the game machine 2 functions as the common game executing device by realizing the online session between the players matched with each other by the online matching.

In the above embodiment, the associates of the player are determined at the moment of login, the IDs (the community ID or the user ID) as the information of the associates are provided to the game machine 2, and at the moment of selecting a tune, the tune selection information of all players who are waiting for the online matching is provided to the game machine (the master machine) 2, and the game machine 2 recognizes the tunes being selected by the associates based on the tune selection information and the information of the associates obtained. However, the present invention is not limited to such embodiment. For example, when the game machine 2 requests the game server 3A to provide the tune selection information, the ID of the player (the card ID, the user ID, or the community ID) may be provided to the game server 3A, the game server 3A searches all players who are waiting for the matching to detect the associates, and the tunes being selected by the associates detected may be notified from the game server 3A to the game machine 2. In this case, it is enough that the game machine 2 presents to the player that the tunes notified from the game server 3A are the ones which are being selected by the associates.

In the above embodiment, the game machine 2 is configured as a game machine for commercial use to be installed to a commercial facility. However, the game machine is not limited to the game machine for commercial use, and may be a game machine for personal use. The facility where the game machine is installed is not limited to the commercial facility, and may be a public facility or a personal facility. In the present invention, the game machine is not limited to a music game machine, and can be replaced with any kind of game machine. In this case, each of the selective items of the game can be sectioned based on various kinds of aspects such as a stage, a map, and a scenario. The common game is not limited to a game where plural players play a game cooperatively, and may be a game where the players battle each other.

As the system of the present invention, it is enough as long as plural game machines are connected to the network, and thereby the selection state of selective item of a player of each of the game machines can be obtained. It is not always necessary that the game system is configured so that plural players participate in a common game. For example, a game system which is configured so that: plural players select an identical item and each of the players plays a game independently; and the players compete against each other online or offline for scores or the like as a game result can be applied to the present invention. Moreover, even if a game system is configured so that players having a predetermined relation select an item different from each other and play a game, and the players share their opinions on the game-play and the like with each other online or offline, the game system can be applied to the present invention. In this way, in the case that each of the players having a predetermined relation plays a game independently, the matching device can be also omitted. The selection state pertaining to the selective item is not limited to a selection state that a player is making the selection. For example, as a guideline for selecting an item for the player, the following selection state can be used: selection history of players having the predetermined relation gets accumulated; and the players are allowed to refer to the selection history accumulated mutually.

What is claimed is:

1. A game system including a plurality of game machines connected to a network to make a player of each of the plurality of game machines: select a desired selective item from a plurality of selective items which are used in a game; and play at the game machine of the player the game having content reflecting the selective item selected, the game system comprising:
   a data storage device storing relation data having information necessary for determining whether or not a predetermined connection exists between players; and
   a computer, the computer functioning by executing a computer program as:
   a selection state determining device configured to determine the selective item selected from the plurality of selective items by the player at each of the plurality of game machines;
   a relation determining device configured to determine based on the relation data another player having the predetermined connection with the player;
   a selection state presenting device configured to present to the player when the player is allowed to select the desired item, the selective item determined by the selection state determining device pertaining to another player who is determined by the relation determining device as the another player having the predetermined connection; and
   a selection executing device configured to present the plurality of selective items while making the player select a desired selective item regardless of whether the player is made to select a player for matchmaking for the game.

2. The game system according to claim 1, further comprising:
   a common game executing device configured to make a plurality of players play a common game, on condition that the selective item selected by each of the plurality of players is identical with each other.

3. The game system according to claim 2, further comprising
   a matching device configured to match players with each other on condition that the selective item selected by each of the players is identical with each other, wherein
   the game machine comprises:
      a matching requesting device configured to while providing to the matching device information necessary for specifying the selective item selected by the player, request matching to the matching device,
   the selection state presenting device is configured to provide to the player making the selection, information for determining the selective item selected by the another player having the predetermined connection and also requesting the matching to the matching device, and
   the common game executing device is configured to make the players play the common game, the players being matched with each other by the matching device in response to the request from the matching requesting device.

4. The game system according to claim 1, further comprising
   an interaction service providing device configured to provide a communication site via the network to the players having the predetermined connection.

5. The game system according to claim 4, wherein
   a terminal apparatus for personal use being used by the player as a user is connectable to the network, and
   the interaction service providing device is configured to provide the communication site to the user of the terminal apparatus.

6. The game system according to claim 5, wherein
   the interaction service providing device is configured to set the predetermined connection based on instructions of the user from the terminal apparatus.

* * * * *